US012183015B2

(12) United States Patent
Vaishnav et al.

(10) Patent No.: US 12,183,015 B2
(45) Date of Patent: Dec. 31, 2024

(54) INTERACTING MULTI-MODEL TRACKING ALGORITHM USING REST STATE MODEL

(71) Applicant: Infineon Technologies AG, Neubiberg (DE)

(72) Inventors: Prachi Vaishnav, Unterhaching (DE); Avik Santra, Munich (DE)

(73) Assignee: Infineon Technologies AG, Neubiberg (DE)

( * ) Notice: Subject to any disclaimer, the term of this patent is extended or adjusted under 35 U.S.C. 154(b) by 411 days.

(21) Appl. No.: 17/582,823

(22) Filed: Jan. 24, 2022

(65) Prior Publication Data

US 2022/0237807 A1    Jul. 28, 2022

(30) Foreign Application Priority Data

Jan. 27, 2021 (EP) .................................... 21153870

(51) Int. Cl.
G06T 7/246    (2017.01)
G06T 7/521    (2017.01)
G06T 7/593    (2017.01)

(52) U.S. Cl.
CPC .............. *G06T 7/251* (2017.01); *G06T 7/521* (2017.01); *G06T 7/593* (2017.01)

(58) Field of Classification Search
CPC ......... G06T 7/251; G06T 7/521; G06T 7/593; G06T 7/246; G06T 7/33;
(Continued)

(56) References Cited

U.S. PATENT DOCUMENTS

2020/0033857 A1    1/2020   Yu et al.
2020/0193166 A1*   6/2020   Russo ..................... G06V 20/52
(Continued)

FOREIGN PATENT DOCUMENTS

WO    2019136479 A1    7/2019
WO    2019170649 A1    9/2019
WO    2020256603 A1    12/2020

OTHER PUBLICATIONS

Ester, M. et al. "A density-based algorithm for discovering clusters in large spatial databases with noise." KDD-96 Proceedings, vol. 96, No. 34, 1996, 6 pages.
(Continued)

*Primary Examiner* — Brandon J Miller
(74) *Attorney, Agent, or Firm* — Slater Matsil, LLP

(57) ABSTRACT

In an embodiment, a method includes: obtaining depth data indicative of a time-resolved measurement of a 3-D position of a moveable target in a field-of-view of a depth sensor; and processing the depth data using an interacting multi-model (IMM) tracking algorithm, the IMM tracking algorithm providing, for each one of multiple iterations, tracking data comprising a respective estimate of the 3-D position of the moveable target, wherein the IMM tracking algorithm comprises a first model providing a first output, a second model providing a second output, and a fusion module fusing the first output and the second output to provide the tracking data, wherein the first model models a movement state of the moveable target, and wherein the second model models a rest state of the moveable target.

20 Claims, 7 Drawing Sheets

(58) Field of Classification Search
CPC .......... G06T 2207/10012; G01S 13/42; G01S 13/58; G01S 17/58; G01S 13/50; G01W 17/70; G06F 3/017
See application file for complete search history.

(56) References Cited

U.S. PATENT DOCUMENTS

| | | |
|---|---|---|
| 2020/0312156 A1* | 10/2020 | Sakamaki ............ G08G 5/0021 |
| 2021/0012520 A1* | 1/2021 | Zhou ...................... G01C 11/08 |
| 2021/0043094 A1 | 2/2021 | Heidger |
| 2021/0056713 A1 | 2/2021 | Rangesh et al. |
| 2021/0400435 A1* | 12/2021 | Yeh ........................ H04W 4/33 |

OTHER PUBLICATIONS

Rohling, H. et al. "OS CFAR performance in a 77 GHz radar sensor for car application." Proceedings of International Radar Conference. IEEE, 1996, 6 pages.

Roth, M. et al., "EKF/UKF Maneuvering Target Tracking using Coordinated Turn Models with Polar/Cartesian Velocity." 17th International Conference on Information Fusion (FUSION). IEEE, 2014, 8 pages.

\* cited by examiner

INTERACTING MULTI-MODEL TRACKING ALGORITHM USING REST STATE MODEL

This application claims the benefit of European Patent Application No. 21153870, filed on Jan. 27, 2021, which application is hereby incorporated herein by reference.

TECHNICAL FIELD

The present disclosure relates generally to an electronic system and method, and, in particular embodiments, to an interacting multi-model tracking algorithm using rest state model.

BACKGROUND

Various use cases are known that rely on tracking a 3-D position of a target. Example use cases include human-machine interfaces (HMIs): here, the 3-D position of a user-controlled object, implementing the target, can be tracked. It can be determined whether the target performs a gesture. It could also be determined whether the target actuates an input element of a user interface (UI).

SUMMARY

Accordingly, there may be a need for providing a robust and accurate estimate of the 3-D position of a movable target.

This need is met by the features of the independent claims. The features of the dependent claims define embodiments.

Various examples of the disclosure are concerned with tracking a 3-D position of a moveable target based on depth data of a depth sensor.

In an example, a method includes obtaining depth data. The depth data is indicative of a time-resolved measurement of a 3-D position of a movable target in a field-of-view of a depth sensor. The method also includes processing the depth data using an interacting multi-model (IMM) tracking algorithm. The IMM tracking algorithm provides, for each one of multiple iterations, tracking data that includes a respective estimate of the 3-D position of the movable target. The IMM tracking algorithm includes a first model providing a first output. The IMM tracking algorithm also includes a second model providing a second output. The IMM tracking algorithm includes a fusion module that fuses the first output and the second output to thereby provide the tracking data. The first model models a movement state of the movable target. The second model models a rest state of the movable target.

In a further example, a computer program or a computer-program product or a computer-readable storage medium includes program code. The program code can be loaded and executed by a processor. Upon executing the program code, the processor performs a method. The method includes obtaining depth data. The depth data is indicative of a time-resolved measurement of a 3-D position of a movable target in a field-of-view of a depth sensor. The method also includes processing the depth data using an IMM tracking algorithm. The IMM tracking algorithm provides, for each one of multiple iterations, tracking data that includes a respective estimate of the 3-D position of the movable target. The IMM tracking algorithm includes a first model providing a first output. The IMM tracking algorithm also includes a second model providing a second output. The IMM tracking algorithm includes a fusion module that fuses the first output and the second output to thereby provide the tracking data. The first model models a movement state of the movable target. The second model models a rest state of the movable target.

In yet a further example, a device includes a processor and a memory. The processor can load program code from the memory and execute the program code. Upon executing the program code, the processor is configured to obtain depth data. The depth data is indicative of a time-resolved measurement of a 3-D position of a movable target in a field-of-view of a depth sensor. The processor is further configured to process the depth data using an IMM tracking algorithm. The IMM tracking algorithm provides, for each one of multiple iterations, tracking data that includes a respective estimate of the 3-D position of the movable target. The IMM tracking algorithm includes a first model providing a first output. The IMM tracking algorithm also includes a second model providing a second output. The IMM tracking algorithm includes a fusion module that fuses the first output and the second output to thereby provide the tracking data. The first model models a movement state of the movable target. The second model models a rest state of the movable target. In yet a further example, a system includes the device and the depth sensor. In yet a further example, a method includes determining an estimate of a 3-D position of a moveable target using an IMM tracking algorithm. This is based on measurements of depth data. At least one model of the IMM tracking algorithm models a rest state of the moveable target.

In yet a further example, a device includes means for obtaining depth data. The depth data is indicative of a time-resolved measurement of a 3-D position of a movable target in a field-of-view of a depth sensor. The device also includes means for processing the depth data using an IMM tracking algorithm. The IMM tracking algorithm provides, for each one of multiple iterations, tracking data that includes a respective estimate of the 3-D position of the movable target. The IMM tracking algorithm includes a first model providing a first output. The IMM tracking algorithm also includes a second model providing a second output. The IMM tracking algorithm includes a fusion module that fuses the first output and the second output to thereby provide the tracking data. The first model models a movement state of the movable target. The second model models a rest state of the movable target.

In yet a further example, a device includes a module for obtaining depth data. The depth data is indicative of a time-resolved measurement of a 3-D position of a movable target in a field-of-view of a depth sensor. The device also includes a module for processing the depth data using an IMM tracking algorithm. The IMM tracking algorithm provides, for each one of multiple iterations, tracking data that includes a respective estimate of the 3-D position of the movable target. The IMM tracking algorithm includes a first model providing a first output. The IMM tracking algorithm also includes a second model providing a second output. The IMM tracking algorithm includes a fusion module that fuses the first output and the second output to thereby provide the tracking data. The first model models a movement state of the movable target. The second model models a rest state of the movable target.

In an embodiment, a method includes determining an estimate of a 3-D position of a moveable target using an interacting multi-model (IMM) tracking algorithm based on measurements of depth data, at least one model of the IMM tracking algorithm modeling a rest state of the moveable target.

It is to be understood that the features mentioned above and those yet to be explained below may be used not only in the respective combinations indicated, but also in other combinations or in isolation.

DETAILED DESCRIPTION OF ILLUSTRATIVE EMBODIMENTS

Figure 1:
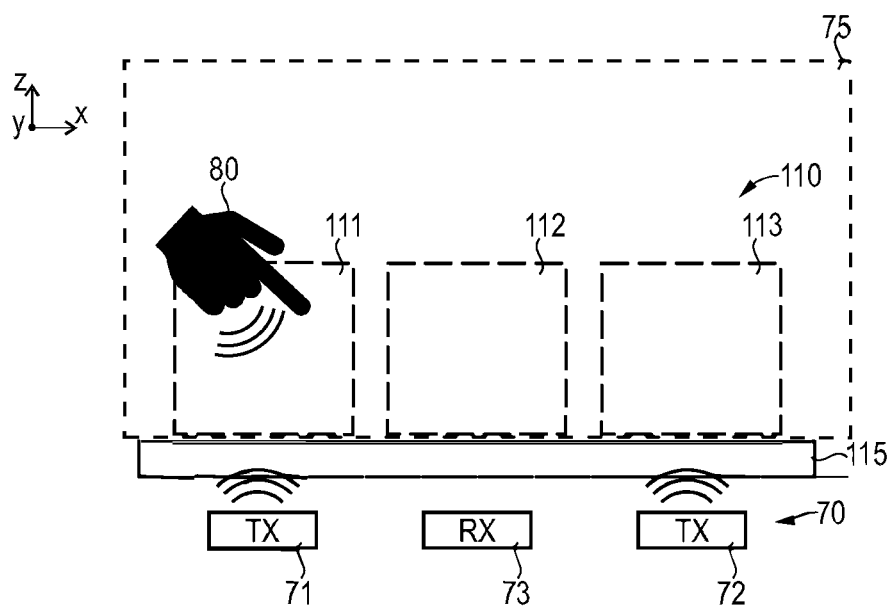
FIG. 1 schematically illustrates a user interface and a user-controlled object according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be as-signed to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become ap-parent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques will be described that facilitate estimating a 3-D position of a movable target. According to the various examples described herein, it is possible to obtain an estimate of the 3-D position of the movable target (hereinafter, simply target) at a given point in time or at multiple points in time, i.e., time resolved.

According to the various examples, the 3-D position can be described by a state and state covariance—i.e., describing the estimation error of the state—of the target. The state can be expressed by a state vector that includes entries that describe the location in space, i.e., the 3-D position. Optionally, the state vector could include further entries, e.g., velocity and/or acceleration.

In other words, according to the various examples disclosed herein, the 3-D position of the moveable target can be tracked.

Tracking data that is determined by a respective tracking algorithm can include the at least parts of the state vector and optionally the state covariance. The tracking data can include the estimate of the 3-D position of the moveable target.

As a general rule, the tracking data can include or, at least, indicate additional information. The additional information may be obtained from the tracking algorithm. For example, it would be possible that the tracking data is indicative of a likelihood that the target is in a given one of multiple predefined states of its motion (simply state hereinafter). This could be achieved by including a respective likelihood. It would also be possible that the information content or the structure of the information content is changed, depending on whether or not the target is in a given one of multiple predefined states. Such augmented information facilitates post-processing. For instance, it would be possible to select between multiple post-processing algorithms, depending on such additional information.

According to various examples described herein, the tracking data can be determined based on depth data that is indicative of a time-resolved measurement of a 3-D position of the target in a field-of-view (FOV) of a depth sensor.

According to the various techniques described herein, various types of depth sensors can be used to obtain the depth data. Some options are summarized in TAB. 1 below.

TABLE 1

Various options for depth sensors that can be used in the various examples described herein. Hereinafter, examples will, in particular, be described in connection with a radar sensor, for illustrative purposes. However, the respective techniques can also be readily applied using depth data obtained from other types of sensors. In some scenarios, it would even be possible that depth data from multiple depth sensors, e.g., of different type is obtained.

| Brief description | Example details |
|---|---|
| Radar sensor | A millimeter-wave radar sensor may be used that operates as a frequency-modulated continuous-wave (FMCW) radar that includes a millimeter-wave radar sensor circuit, a transmitting antenna, and a receiving antenna.<br>A millimeter-wave radar sensor may transmit and receive signals in the 20 GHz to 122 GHz range. Alternatively, frequencies outside of this range, such as frequencies between 1 GHz and 20 GHz, or frequencies between 122 GHz and 300 GHz, may also be used.<br>A radar sensor can transmit a plurality of radiation pulses, such as chirps, towards a scene. This refers to a pulsed operation. In some embodiments the chirps are linear chirps, i.e., the instantaneous frequency of the chirp varies linearly with time.<br>A Doppler frequency shift can be used to determine a velocity of the target.<br>Raw measurement data provided by the radar sensor can thus indicate depth positions of multiple objects of a scene. It would also be possible that velocities are indicated. |
| Time-of-flight (TOF) sensor | A TOF sensor can employ a light pulse - e.g., transmitted by a Light Emitting Diode (LED) - that is emitted towards a scene. The round-trip time of the light pulse can be measured and based on the round-trip time the distance to an object in the scene can be determined.<br>Raw measurement data provided by the TOF sensor may thus be indicative of the depth positions of multiple objects of a scene. |
| Stereo camera | A stereo camera does not use active illumination of the scene (e.g., in contrast to the TOF sensor). The stereo camera provides two or more perspectives on the scene and, based on a difference of the images acquired with the multiple perspectives, it is possible to judge the distance and object has with respect to the optics.<br>Raw measurement data provided by the stereo camera may thus be indicative of the depth positions of multiple objects of a scene. |
| LIDAR sensor | A Light Detection and Ranging (LIDAR) sensor uses a laser to illuminate the scene. A LIDAR sensor that uses continuous-wave operation maybe used; Doppler measurements are possible. It is possible to use a flash illumination where multiple parts of the scene are contemporaneously illuminated.<br>Raw measurement data provided by the LIDAR sensor may thus be indicative of the depth positions of multiple objects of a scene. Also, velocities could be indicated, based on Doppler measurements. |

It is possible to employ different depth sensors, cf. TAB. 1, depending on the particular use case. In particular, the size of the FOV is correlating with the size of the target. For instance, LIDAR and radar sensors can be configured for short-range sensing or long-range sensing. Long-range sensing—e.g., having FOVs with dimensions in the range of meters or several tens or even hundreds of meters—may be preferable when tracking people in a traffic surrounding, while short-range sensing—e.g., having FOVs with dimensions in the range of centimeters or tens of centimeters—may be preferable when tracking a finger or a hand or a handheld device.

According to various examples, the tracking data can be used in various use cases. According to some examples, it is possible that the tracking data is used to control an HMI. The HMI may detect gestures. A gesture can be defined by a certain movement (e.g., having a certain shape or form) and optionally velocities or accelerations performed by the target. The HMI may employ a UI. The UI may include one or more input elements that are defined with respect to the FOV of the depth sensor. For example, it is possible to determine, based on the tracking data, whether the target addresses a certain input element, e.g., by hovering without movement in an area associated with that input element. It could then be judged whether the certain input element is actuated, e.g., if the target addresses the certain input element for a sufficiently long time duration. A specific type of use case employing such an HMI would be the tracking of a palm or finger or a handheld pointing device (such as a stylus) on and above a touchscreen of an infotainment system or a screen for ticket machines for touchless sensing.

A further use case would relate to tracking objects in autonomous vehicles, e.g., tracking persons in a surrounding of an autonomous vehicle. Such persons may cross the street or stand still at a traffic light or at the side of the street.

Yet a further use case can include virtual-reality applications. A user engaged in the virtual-reality application can be tracked. For example, the user may engage in a motion or also stand still at least for certain time durations.

As will be appreciated from the above, along with the various possible use cases of the tracking data, different types of targets can be tracked. As a general rule, the target could be one of the following: a hand or a part of the hand of a person; a handheld pointing device; a person; a vehicle; etc.

Various techniques are based on the finding that it can be helpful to detect rest states of the target, e.g., in the various use cases described above. The rest state can be associated with the hand or finger not moving above an input element of a UE, or a person standing at the side of the street, or a user resting in a virtual-reality application. According to techniques described herein, it is possible to reliably detect the target being in a rest state. An accurate estimate of the 3-D position can be determined, in particular when the target is in the rest state.

According to various examples, a tracking algorithm is employed. The tracking algorithm can iteratively process the depth data, for multiple time increments. i.e., each iteration of multiple iterations can correspond to a respective time increment. The tracking algorithm provides the tracking data.

The tracking algorithm can predict, for each iteration of multiple iterations, the 3-D position of the moveable target using one or more assumptions for the movement of the target and based on the depth data. This prediction can be based on the state and state covariance of the previous iteration, as well as up-to-data depth data of the respective iteration.

According to various examples described herein, a specific kind of tracking algorithm can be employed. Specifically, a multi-model (MM) tracking algorithm can be used to process the depth data obtained from the depth sensor. The MM tracking algorithm provides the tracking data.

As a general rule, the MM tracking algorithm employs multiple motion models that process the depth data simultaneously, but using different calculations. In particular, the multiple motion models can use different assumptions with respect to the observed motion state of the target. Different models can be parameterized differently. Different models can be used to track different types of motion that the target is expected to engage in. Each model predicts where the target will be after a time increment associated with each iteration of the MM tracking algorithm, if the target engages in the particular type of motion associated with the respective motion state associated with that model.

The individual outputs of the models—i.e., a respective predicted state and state covariance—are combined by a fusion module of the MM tracking algorithm—e.g., in a weighted manner based on the likelihood that the target performs the motion state modeled by the respective model—, to thereby provide an overall estimate of the 3-D position of the moveable target.

In even further detail, the MM tracking algorithm may be implemented by an interacting MM (IMM) tracking algorithm. The IMM is a modification of the MM; here, the multiple models are interacting. This means that outputs of at least some of the multiple models influence the inputs of at least some of the multiple models in a subsequent iteration. A Markovian decision process may be used to consider the a-priori likelihood of the target being in the respective motion state of that model at each iteration. The transition probabilities of the Markovian decision process—describing the likelihood of a transition from a first motion state to a second motion state and describing the likelihood of the target remaining in a given motion state—can be predefined in the various examples described herein. This likelihood can then be used to determine an a-priori state estimate for the target, i.e., in particular an a-priori estimate of the 3-D position of the target.

According to various examples described herein, the IMM tracking algorithm employs state models according to TAB. 2.

TABLE 2

Two models of an IMM tracking algorithm that can be used in the techniques disclosed herein. The rest state model and the movement state model orthogonal states, because the target either has a non-zero velocity - thus is described by the movement model - or has a zero velocity - thus is described by the rest state model. According to various examples, it would be possible to employ multiple movement models, e.g., to cover multiple different movement states.

| Model | | Example description |
|---|---|---|
| I | Movement state model | The movement state model assumes that the target changes its position over the course of time, i.e., has a non-zero velocity. The movement state model may thus also be labeled dynamic model. Thus, a state vector describing the state estimate of the movement state model includes the position, as well as one or more velocity measures of the target. The particular type of movement state model is not germane to the functioning of the techniques described herein. In particular, there are various movement state models known in literature that can be used to model the movement of the target, e.g., constant acceleration, non-linear acceleration, etc. For example, a coordinated turn model could be used. Here, it is assumed that the target moves in circle segments using constant speed. A turn rate is assumed. Examples are described, e.g., in Roth, Michael, Gustaf Hendeby, and Fredrik Gustafsson. "EKF/UKF maneuvering target tracking using coordinated turn models with polar/Cartesian velocity." 17th International Conference on Information Fusion (FUSION). IEEE, 2014. For example, when using a radar sensor, the coordinated turn model can provide the state vector according to $X = [p_x\ p_y\ v_r\ h\ \omega]$ (1) Where $p_x$, $p_y$ denotes the 3-D position of target in x − y plane, $v_r$ denotes the radial velocity, h the angle from the depth sensor, and $\omega$ the change in angle/polar velocity - the turn rate. The prediction is implemented as $X = F X + Q$ (2) Describing the coordinated turn motion using polar velocity - as appropriate for the radar sensor -, where $$F = \begin{bmatrix} x_1 + \frac{2v}{\omega}\sin\left(\frac{\omega T}{2}\right)\cos\left(h + \frac{\omega T}{2}\right) \\ x_2 + \frac{2v}{\omega}\sin\left(\frac{\omega T}{2}\right)\sin\left(h + \frac{\omega T}{2}\right) \\ v \\ h + \omega T \\ \omega \end{bmatrix}.$$ And $x_1 = p_x$, $x_2 = p_y$. Q denotes the system noise. An unscented Kalman filter can be used to provide a minimum error solution to the non-linear system of Eq. 2. |
| II | Rest state model | The rest state model operates under the assumption of zero velocity of the target. In contrast to the movement state model of example I, the state vector provided by the rest state model does not include an estimate for the velocity, since it is assumed to be zero, by definition. The state vector can, at least, include the 3-D position of the target. $X = [p_x\ p_y]$ (3) The prediction is given by: $X = X + q$ , $q \in N (0, Q)$, (4) Where q models a Gaussian distribution of the location around the position, as noise. As a general rule, other probability distributions can be used. |

In both models according to example I and II of TAB. 2, it is possible to convert between the polar coordinates and Cartesian coordinates, where the depth data is available in polar coordinates due to the formatting of the raw measurement data and the sensor modality. Such conversion is described by Eqs. 5 and 6 below.

$$r = \sqrt{(p_x^2 + p_y^2)} \quad (5)$$

$$\theta = \tan\left(\frac{p_y}{p_x}\right) \quad (6)$$

r denotes the radial distance and θ describes the angular coordinate.

This defines the output transition matrix H—implementing a non-linear transformation—describing the measurement system providing the depth data, according to:

$$Z = H(X), \quad (7)$$

where Z is the projection of the predicted state X onto the measurement subspace. When obtaining depth data Y (r, θ, $v_r$) at time t, then the innovation is given by Z–y, i.e., as the difference between actual measurement from the sensor and the projected predicted measurement from the IMM tracking algorithm. The innovation is also used for computing Mahalanobis distance—as will be explained below in connection with Eq. 8—and thus model likelihoods.

For Eq. (7), unscented transformations can be used, e.g., as part of the unscented Kalman filter.

Using such IMM tracking algorithm can be helpful to facilitate robust and accurate tracking of the target. In particular, it is possible to adequately cover scenarios where the target does not move, but stands still. Various techniques are based on the finding that such a resting target can be relevant in many use cases. One such use case that can profit from these techniques will be described next in connection with FIG. 1.

FIG. 1 schematically illustrates aspects with respect to a system including a radar depth sensor 70 (cf. TAB. 1) and a UI 110 including multiple input elements 111-113.

In the illustrated example, the radar sensor 70 includes two transmitters 71, 72 that can transmit millimeter electromagnetic waves. A phased array antenna can be used. The radar sensor 70 also includes a receiver 73 that can detect backscattered electromagnetic waves. Beamforming can be used in order to detect the lateral position in the xy-plane of the object. The depth position—along the z-axis—can be judged from a phase shift of the backscattered electromagnetic waves with respect to the emitted electromagnetic waves. Thereby, it is possible to detect objects in a scene, in particular a target 80. The FOV 75 of the radar depth sensor 70 is also illustrated.

Within the FOV 75, the UI 110 is predefined. The UI 110 includes multiple input elements 111-113. For instance, these input elements 111-113 could be associated with different buttons that are displayed on a screen 115. For example, different tickets of a ticket vending machine may be associated with the different buttons, to give just one practical example.

There are various modes conceivable for the target 80 to interact with the UI 110. Some modes are summarized in TAB. 3.

TABLE 3

Various states that the target can assume. These states could be interpreted differently and an HMI may be controlled accordingly. The states of TAB. 3 are orthogonal to each other, i.e., per definition, the target can be in either one of the two states.

| | Target motion | Example description |
|---|---|---|
| I | Movement state | It would be possible that the target 80 performs a movement (non-zero velocity), e.g., defining a gesture. Here, the target 80 changes its position over the course of time using a predefined pattern. A gesture can cause a certain HMI response. The movement state can be modeled by the movement state model according to TAB. 2, example I. |
| II | Rest state | The target 80 - e.g., a user's finger - may point towards one of the input elements 111-113, thereby coming to rest within the respective area (dashed lines) associated with a respective one of the input elements 111-113. Thereby, the target can address the respective input element 111-113. The user can actuate the input element 111-113. This can cause an HMI response. The velocity of the target 80 can be assumed to be zero or negligible small, in particular on the time scale defined by the time increments between subsequent iterations of the IMM tracking algorithm, i.e., if compared to the temporal resolution of the IMM tracking algorithm. The rest state can be modeled by the rest state model according to TAB. 2, example II. |

Figure 2:
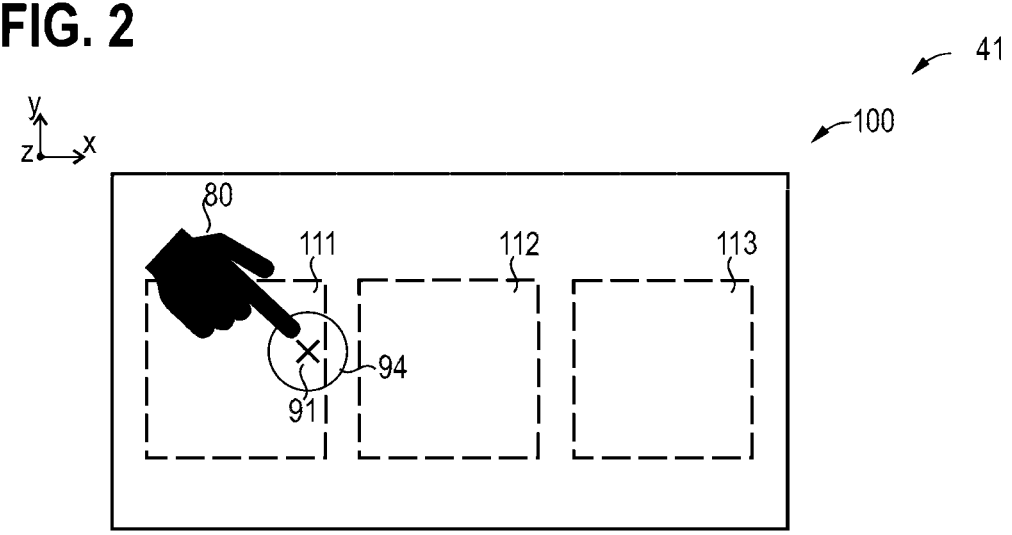
FIG. 2 schematically illustrates a rest state of the user-controlled object according to various examples.

FIG. 2 schematically illustrates aspects with respect to the rest state 41 of the target 80, according to a TAB. 3: example II. FIG. 2 is a schematic top view. FIG. 2 illustrates that the target 80 statically hovers in the region associated with the input element 111. The respective 3-D position 91 of the target 80 is illustrated.

Also illustrated is a measurement noise 94. Typically, the radar sensor 70 exhibits measurement inaccuracies such as statistical fluctuations and, accordingly, the depth data obtained from the radar sensor 70 can experience a blur of the position 91 defined by the measurement noise 94.

According to various examples, it is possible to provide an accurate estimate of the 3-D position 91 and, more specifically, provide an accurate estimate of the target 80 addressing the input element 111, even in view of the measurement noise 94. Outliers—e.g., sudden jumps in the measured state due to noise—can be removed.

Figure 3:
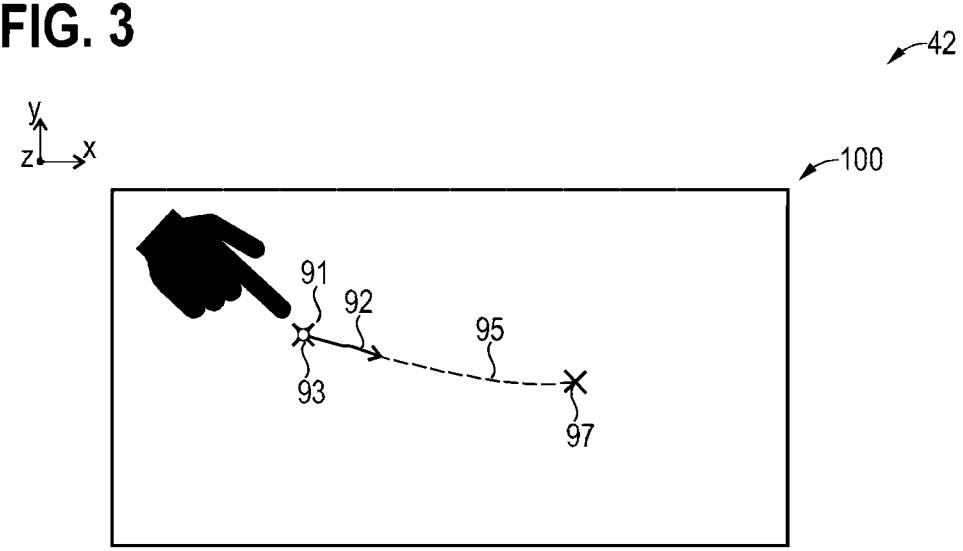
FIG. 3 schematically illustrates a movement state of the user-controlled object according to various examples.

FIG. 3 schematically illustrates aspects with respect to a movement state 42 of the target 80, according to TAB. 3: example I. FIG. 3 is a schematic top view, corresponding to the schematic top view of FIG. 2. FIG. 3 illustrates that the target 80 moves—at a certain velocity 92—along a trajectory 95, between a start position 93 and an end position 97. The position 91 changes over the course of time. The target 80 may perform a swipe gesture such as a swipe-to-unlock or swipe-to-confirm gesture in the illustrated example.

Figure 4:
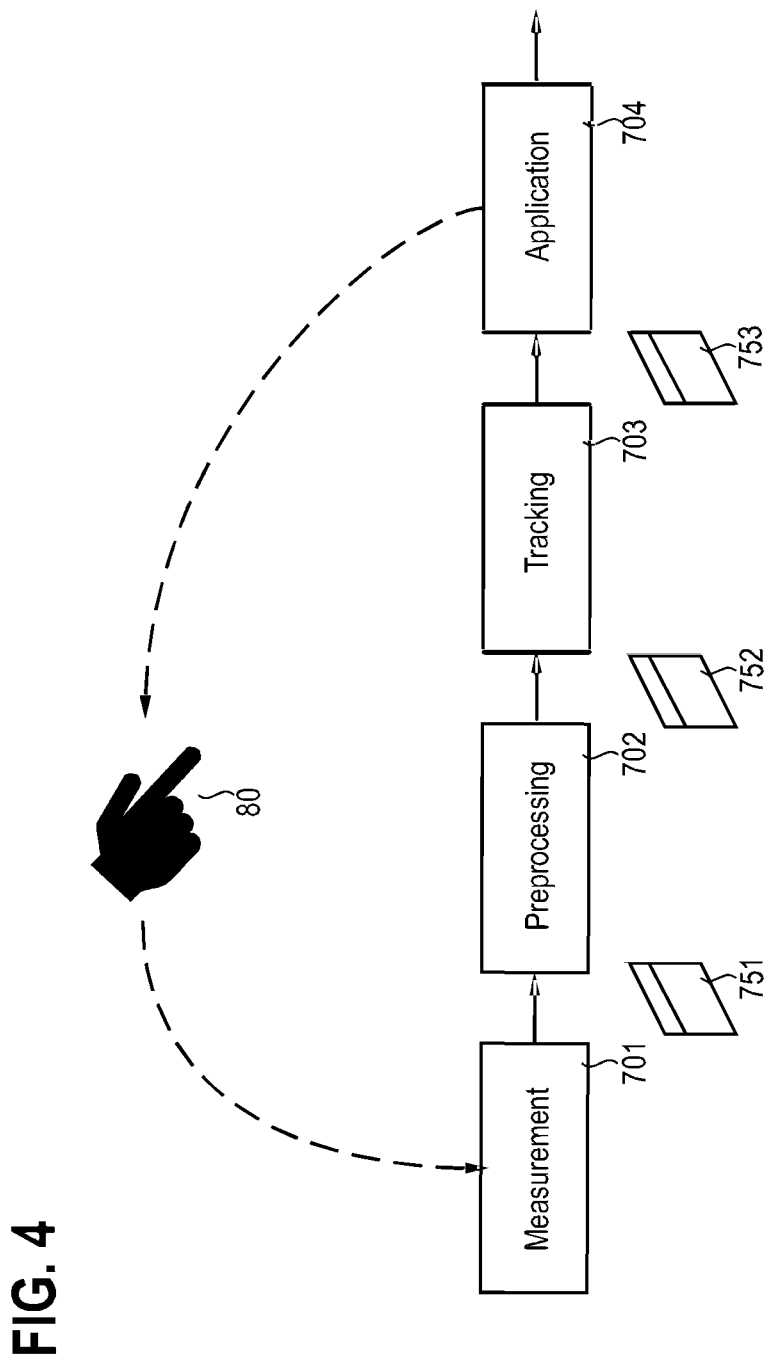
FIG. 4 schematically illustrates a processing flow of multiple logic operations according to various examples.

FIG. 4 schematically illustrates the signal processing according to various examples. FIG. 4 illustrates a processing flow of multiple logical operations.

At box 701, a depth sensor—e.g., the radar sensor 70 of FIG. 1; also cf. TAB. 1—is used to acquire raw measurement data 751. The raw measurement data 751 is suitable for determining the 3-D position of the target 80. Thus, a Z-position of the target 80 can be measured.

The particular measurement modality used to obtain the raw measurement data 751 is not germane to the functioning of the techniques described herein.

The raw measurement data 751 is then pre-processed at box 702, to obtain depth data 752.

The depth data 752 comprises one or more observables indicative of the 3-D position of the target 80. For instance, the radial distance in a polar reference coordinate system could be indicated. It would also be possible that the xyz-position in a Cartesian coordinate system is indicated. A conversion according to Eqs. 5 and 6 can be made.

The depth data 752 can be subject to measurement noise stemming from imperfections of the depth sensor.

Next, tracking of the 3-D position of the target is performed at box 703. An IMM tracking algorithm can be employed. Thereby, tracking data 753 is obtained. The tracking data comprises an estimate of the 3-D position of the target 80. The measurement noise can be reduced.

The tracking data 753 can also be indicative of further information, e.g., a likelihood of the target 80 being in either the rest state 41 or the movement state 42. Such additional information can be obtained from the IMM tracking algorithm of box 703. Such additional information can be used to configure post-processing of the tracking data 753 at box 704. For instance, a respective post-processing algorithm may be selected depending on the assistance information.

In detail, a use-case specific application is executed at box 704 based on the tracking data 753. Various use cases have already been explained above, e.g., a UI including multiple input elements can be used to control an HMI (cf. FIG. 1). It is possible that the application provides an output to the user such that a continuous user-machine interface—illustrated in FIG. 4 by the dashed arrows—is implemented.

Figure 5:
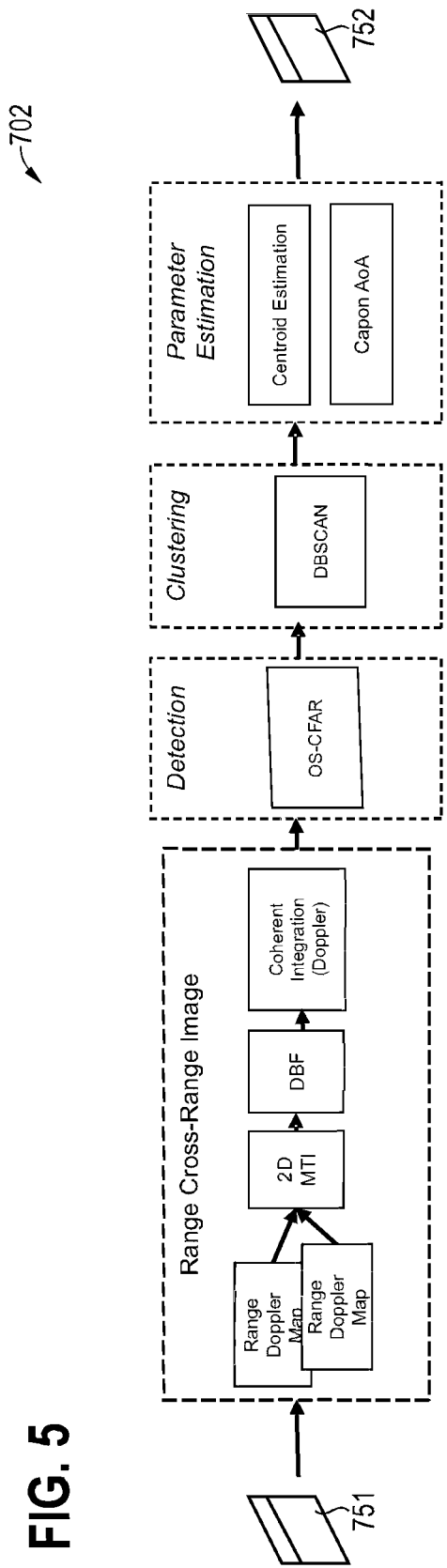
FIG. 5 schematically illustrates processing of raw measurement data to obtain depth data according to various examples.

FIG. 5 illustrates details with respect to an example implementation of box 702. The raw measurement data 751 corresponds to multiple range Doppler maps obtained from multiple receivers of the radar sensor 70. Based on Doppler information, a moving target indication (MTI) can be performed. Digital beamforming (DBF) can be used to separate waveform is associated with different directions in the scene. A Doppler analysis can be performed to obtain an indication of the velocity.

Next, object detection can be used using constant false alarm rate (CFAR) algorithms. In particular, in order-statistic (OS) CFAR algorithm can be used to suppress clutter. See, e.g., Rohling, Hermann, and Ralph Mende. "OS CFAR performance in a 77 GHz radar sensor for car application." Proceedings of International Radar Conference. IEEE, 1996.

Clustering can be used to determine extensions of objects, including the target. One algorithm is DBSCAN, see Ester, Martin, et al. "A density-based algorithm for discovering clusters in large spatial databases with noise." Kdd. Vol. 96. No. 34. 1996.

Then, parameters of the target can be estimated, e.g., the center (centroid estimation) and the angle of arrival.

Finally, the depth data 752 is obtained. In the illustrated example a vector is obtained that specifies distance/range, angle and speed of a center of the target; i.e., the 3-D position is defined in a polar reference coordinate system.

FIG. 5 is only one example of pre-processing at box 702. In particular, depending on the type of depth sensor used (cf. TAB. 1), different pre-processing techniques may be applied at box 702. Even when preprocessing radar raw measurement data 751, different preprocessing techniques are available. The particular type of pre-processing is not germane for the various techniques described herein.

Figure 6:
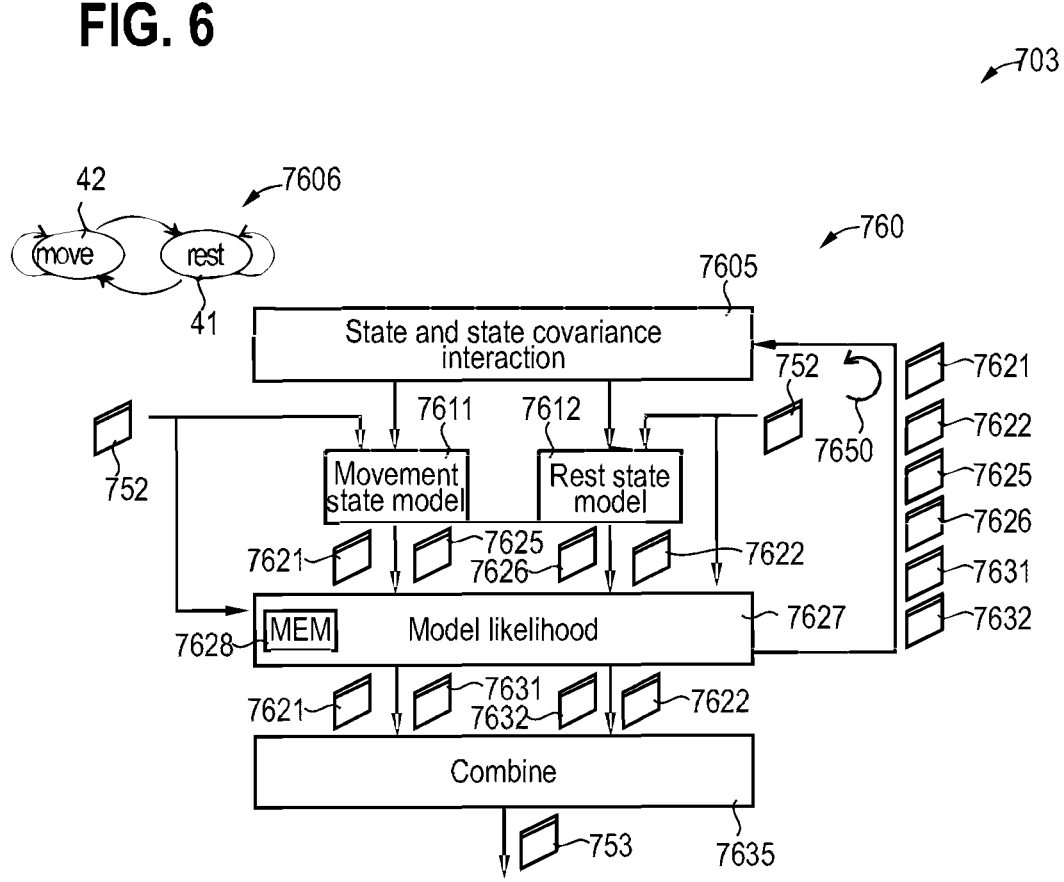
FIG. 6 schematically illustrates processing depth data to obtain tracking data according to various examples.

FIG. 6 schematically illustrates the tracking of the target based on the depth data 752 executed at box 703. Specifically, FIG. 6 illustrates aspects with respect to a possible implementation of the IMM tracking algorithm 760.

At the core of the IMM tracking algorithm 760 are the movement state model 7611, and the rest state model 7612, according to TAB. 2: example I and example II, respectively.

Both models 7611, 7612 process, in parallel, the depth data 752, at multiple iterations 7650 of the IMM tracking algorithm 760. Per iteration 7650, a respective output of the process explained above in connection with box 702 may be obtained and processed as the depth data 752; this depth data 752 then corresponds to the target being observed at the respective time instance associated with this iteration 7650. The depth data 752 thus provides the measured state of the target 80 (denoted Y above). The depth data 752 includes the measured state vector. The depth data 752 is used to make state predictions.

The movement state model 7611 outputs a first state vector 7621 and an associated first state covariance 7625, as explained in connection with Eq. 2 above. The first state vector 7621 includes the 3-D position 91 and one or more measures of the velocity 92. For example, the polar velocity ω and the radial velocity $v_r$ can be used in the coordinated turn model explained in TAB. 2: example I.

The rest state model 7612 outputs a second state vector 7622 and an associated second state covariance 7626, as explained above in connection with Eq. 4 above. The second state vector 7622 output by the rest state model 7612 includes the 3-D position of the target, but does not include the velocity—because the velocity is, per definition, zero for the rest state model 7612.

The IMM tracking algorithm 760 generally combines state hypotheses from multiple filter models to get a better state estimate of targets with changing dynamics. A fusion module includes two sub-modules 7627, 7635. The fusion module allows to combine the state hypotheses of the two models 7611, 7612. Details with respect to the fusion module are explained below.

Firstly, a model likelihood module 7627 of a fusion module determines a first likelihood 7631 of the target 80 being in the movement state 42 associated with the movement state model 7611 and further determines a second likelihood 7632 of the target 80 being in the rest state 41 associated with the rest state model 7612.

This determination can be based on the respective state covariances 7625, 7626. For example, the larger the uncertainty, the less likely the respective state.

In particular, it would be possible to determine a first distance between the state estimate 7621, 7625 of the movement state model 7611 and the measured state of the depth data 752—i.e., the innovation—, as well as to determine a second distance between the state estimate 7622, 7626 of the rest state model 7612 and the measured state of the depth data 752. A Mahalanobis distance can be used, to be able to consider the uncertainty of the state estimates described by the state covariances 7625, 7626. These distances can serve as an estimate of the accuracy of each model 7611, 7612, i.e., quantify how much the estimated state differs from the true measured state. Based on the accuracies of the state estimates of each model 7611, 7612, it is then possible to determine the first likelihood 7631 and the second likelihood 7632, respectively.

Optionally, it would be possible to consider an evolution of such accuracy over two or more previous iterations when determining these likelihoods 7631, 7632. For this, the model likelihood module 7627 can employ a memory module 7628. The memory module 7628 can store the respective values—e.g., state, state covariance, measured state—over multiple iterations. It would then be possible to track the evolution of the accuracy over the multiple iterations 7650.

In a specific implementation, the likelihood of the target being in the respective state may be given by:

$$L = \begin{pmatrix} (Y-Z)S^{-1}(Y-Z)^T \\ (Y_{hist}-Z_{hist})(Y_{hist}-Z_{hist})^T \end{pmatrix} \quad (8)$$

where z is the measured state estimate from the depth data 752 and Z is defined in accordance with Eq. 5, i.e., Y−Z is the innovation. S is the covariance matrix of the state covariance 7625 or 7626. The subscript "hist" describes the respective values of one or more previous iterations 7650.

Such tracking of the accuracies helps to increase the score of the model which matched well to the history and also prevents sudden jumps.

Second, it is then possible to determine the tracking data 753 based on a weighted combination using weighting factors that are set in accordance with the first likelihood 7631 and the second likelihood 7632, in a combination module 7635 of the fusion module of the IMM tracking algorithm 760.

To be able to combine the first state vector 7621 and the second state vector 7622 with each other—e.g., in a weighted combination—, it would be possible that the second state vector 7622 is padded using zero values for the respective entries associated with the at least one velocity measure. For example, $v_r=\omega \equiv 0$, cf. Eqs. 1 and 2. Then, the first state vector 7621 and the second state vector 7622 have the same dimension and can be added.

The combination can be expressed as $$X = X_1\mu_1 + X_2\mu_2 \quad (9)$$

where $X_1$ is the state estimate of the rest state model and $X_2$ is the state estimate of the movement model and $\mu_1$ is the likelihood of the rest state model and $\mu_2$ is the likelihood of the rest state model. Here, the likelihoods serve directly as weighting factors.

More generally, the weighting factors can be set so that for higher likelihoods 7631, 7632, the respective estimate of the 3-D position included in the respective state vector 7621, 7622 is considered more pronounced in the final estimate of the tracking data 753. For instance, it would be possible that the tracking data includes the estimation of the 3-D position of obtained from the particular model 7611, 7612 that has a higher likelihood 7631, 7632 for the respective iteration 7650; in other words, one of the two state vectors 7621, 7622 could be discarded.

A weighted combination typically provides for increased accuracy when transitioning between the rest state and the movement state; while a selection between the two state estimates can provide an increased accuracy when the target is statically in the rest state or in the movement state.

As illustrated in FIG. 6, a feedback is provided so that the IMM tracking algorithm 760 updates, for each iteration 7650, the a-priori estimate of the 3-D position of the movable target based on the first output 7621 of the state vector estimated by the movement state model 7611 at that iteration 7650, the second output 7622 of the state vector estimated by the rest model 7612 at that iteration 7650, the first likelihood 7631, the second likelihood 7632, as well as the state covariances 7625, 7626 estimated by the movement state model 7611 and the rest model 7612, respectively.

Based on these values, a Markovian decision process 7606 can be used that determines an a-priori estimate of the 3-D position of the movable target, by considering the likelihood that the target is either in the dynamic state 42 or the rest state 41, respectively and combining the state estimates of the state vector 7621 and the state vector 7622, respectively. Thereby, transitions between the states 41, 42 can be modeled. The models 41, 42 are interacting.

Above, scenarios have been described in which the state estimates provided by the movement state model 7611 and the rest state model 7612 define the 3-D position of the target 80 in the Cartesian coordinates. According to various examples, it is possible that the rest state model 7612 determines the 3-D position of the target 80 with respect to one or more input elements of a user interface, e.g., with respect to the input elements 111-113 of the user interface 110, as discussed above. In particular, the state estimate 7622 can include an indication of a respective input element being addressed by the target 80. Then, the tracking data 753 can—e.g., in addition to the 3-D position in Cartesian coordinates—also provide an indication of the respective input element. For example, the equation 3 could be modified so that the state vector indicates the respective input element:

$$X = [p_x, p_y, l_x, l_y] \quad (10)$$

Here, $l_x$, $l_y$ are indices that label a 2-D matrix of input elements. For instance, $l_x=2$, $l_y=1$ would identify the input element in the first column, second row. For a 1-D vector of input elements (cf. FIGS. 1-3), a single index would suffice.

Such an approach facilitates providing a stable indication of a respective input element being addressed by the target 80 in the rest state. In particular, fast changes between different input elements—e.g., in view of measurement noise 94 (cf. FIG. 2) can be avoided.

Figure 7:
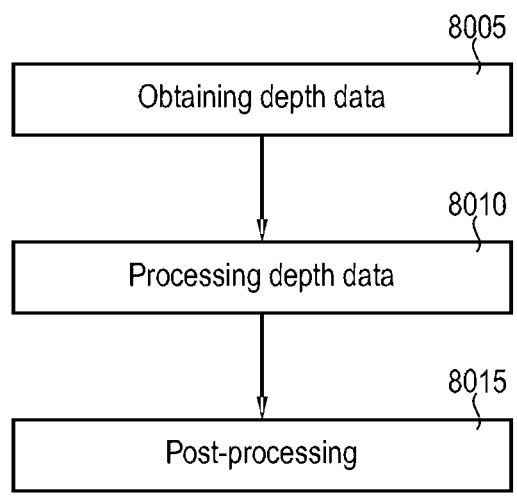
FIG. 7 is a flowchart of a method according to various examples.

FIG. 7 is a flowchart of a method according to various examples. The method of FIG. 7 can be executed by a device comprising a processor. For instance, the processor may load program code from a memory and execute the program code to then execute the method of FIG. 7. The device could be a computing unit of an HMI, coupled to one or more depth sensors. The method of FIG. 7 facilitates tracking of an object.

At box 8005, depth data is obtained. For example, the depth data 752 as discussed in connection with FIG. 4 in FIG. 5 could be obtained. The depth data could be obtained from logic as described in connection with FIG. 4, box 702.

At box 8010, the depth data is processed using an IMM tracking algorithm. Thereby, tracking data is obtained, e.g., the tracking data 753 as discussed in connection with FIG. 6. The tracking data includes an estimate of the 3-D position of the target.

At box 8015, postprocessing can be applied. This can facilitate one or more use-case specific applications, as previously explained in connection with FIG. 4: box 704.

To facilitate the postprocessing at box 8015, the tracking data may include additional information. For instance, the tracking data may be indicative of a likelihood of the target being either in a rest state or a movement state. Such an example is explained in connection with FIG. 8.

Figure 8:
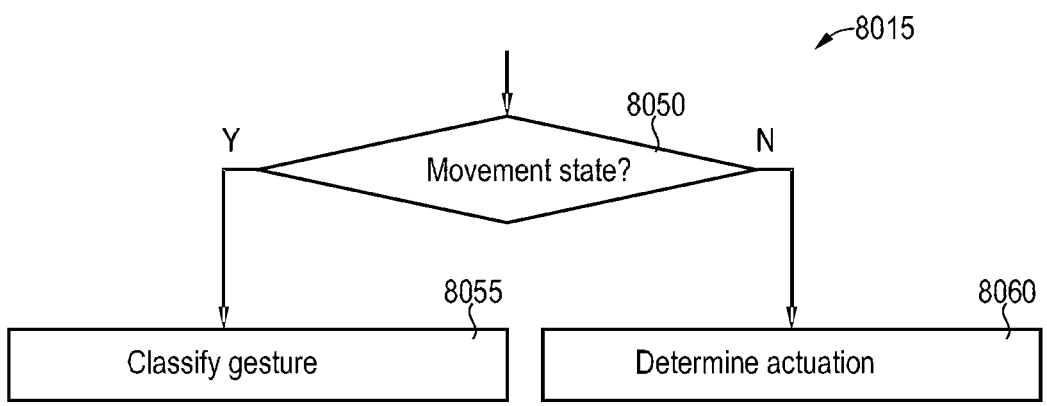
FIG. 8 is a flowchart of a method according to various examples.

FIG. 8 is a flowchart of a method according to various examples. FIG. 8 illustrates an example implementation of box 8015.

At box 8050 a determination is made whether the target is more likely in a movement state (cf. FIG. 3: movement state 42) than in a rest state (cf. FIG. 3: rest state 41). If yes, the method commences at box 8055; if not, the method commences at box 8060. Box 8055 and box 8060 are associated with different post-processing algorithms for post-processing the tracking data.

The selection at box 8050 is made based on the tracking data being indicative of the likelihood of the target being in the movement state or the rest state.

The likelihood that the target is in the respective state can be derived from the model likelihoods, as explained in connection with FIG. 6: model likelihood module 7627.

There are various options to implement the tracking data to be indicative of this likelihood.

In one example, the tracking data could also include an explicit indication of a respective likelihood.

In a further example, an implicit indication could be provided. For instance, the information content of the tracking data may vary depending on the likelihood. To give an example, if the target is likely in the movement state 42, it would be possible to output a time trajectory of the 3-D position as the tracking data, by concatenating the estimated 3-D positions of multiple iterations of the IMM tracking algorithm. Conversely, if the target is likely to be in the rest state 41, it would be possible to include the indication of the respective input element of the UI, e.g., without any time resolution (cf. Eq. 10). i.e., the indication of a selected input element may be selectively included in the tracking data depending on the likelihood of the moveable target being in the rest state.

In the illustrated example of FIG. 8, depending on the likelihood that the target is in the movement state (and, thus, by definition, not in the rest state), it would be possible to select between either a classification of a gesture recognition—box 8055—, or a determination of an actuation of an input element—box 8060.

At box 8055, it would be possible that a gesture classification is selectively applied depending on a likelihood that the target is in the movement state. For instance, the gesture classification could be based on a dynamic trajectory that is defined by the estimates of the 3-D position of the target provided in multiple iterations of the IMM tracking algorithm. An example gesture classification could use a neural network to classify such dynamic trajectories. Another example may employ a rule-based matching algorithm.

Likewise, it would be possible, at box 8060, to determine whether one or more input elements are actuated. This can be based on an indication of the respective input element in the tracking data, cf. Eq. 10. For example, in this connection, it would be possible to apply a time-domain low-pass filter to the indication. Thereby, it can be checked whether the target 80 remains relatively stable, i.e., stable within one of the regions associated with the input elements—for a respective time duration. For example, it could be required that the target remains position in one of these input elements for a time duration that is longer than a predefined threshold time duration, to trigger a respective action of the HMI.

Also, at box 8060, the 3-D position in a Cartesian coordinate system could be mapped to respective positions of the input elements, e.g., in case an explicit indication of an input element is not already included in the tracking data.

Figure 9:
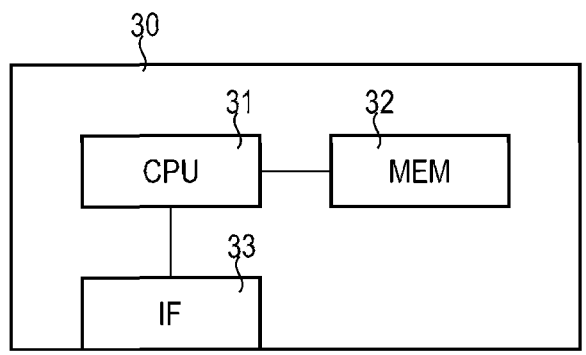
FIG. 9 schematically illustrates a device according to various examples.

FIG. 9 schematically illustrates a device 30 configured to perform techniques described herein. The device 30 includes a processor 31 and a memory 32. The device 30 also includes an interface. For example, it would be possible that the device 30 receives raw measurement data 751 or depth data 752 via the interface 33. The processor 31 can load program code from the memory 32 and execute the program code. Upon executing the program code, the processor performs techniques as described herein, e.g.: processing depth data using an IMM tracking algorithm, preprocessing raw measurement data to obtain the depth data; postprocessing tracking data obtained from the IMM tracking algorithm, e.g., to control an HMI, e.g., by providing respective control instructions via the interface 33. The processor 31 could perform the methods of FIG. 7 or FIG. 8.

Figure 10:
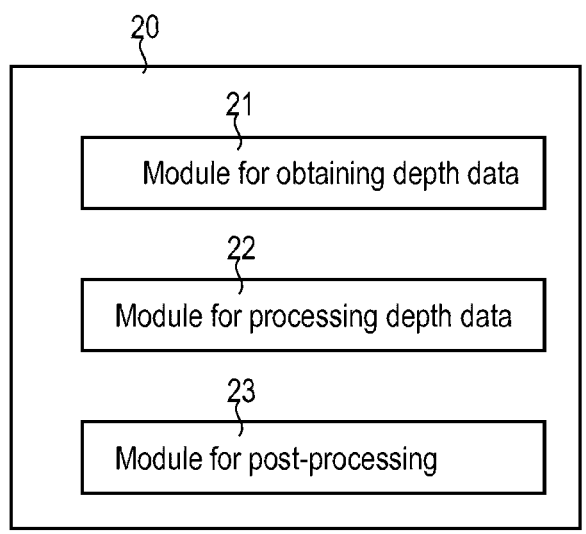
FIG. 10 schematically illustrates a device according to various examples.

FIG. 10 illustrates a device 20 that is configured to perform techniques described herein. The device 20 includes multiple modules 21-23 that could be implemented in software and/or in hardware. For instance, the modules 21-23 could be implemented by software, e.g., by respective portions of program code that can be loaded and executed by a processor.

The module 21 is for obtaining depth data. Accordingly, the module 21 may implement box 8005 of the method of FIG. 7.

The module 22 is for processing the depth data. Accordingly, the module 22 may implement box 8010 of the method of FIG. 7.

The module 23 is for postprocessing tracking data, e.g., as obtained from module 22. Accordingly, the module 23 may implement box 8015 of the method of FIG. 7.

Summarizing, it has been disclosed to determine an estimate of a 3-D position of a moveable target using an IMM tracking algorithm. This is based on measurements of depth data. At least one model of the IMM tracking algorithm models a rest state of the moveable target.

While conventionally IMM tracking algorithms are used for mode matching for different types of motion of a moving target, the disclosure enables to model two orthogonal motion state. One or more first motion states recognize the movement of the target and a second motion state is used is to accurately localize the target—e.g., a finger—when it is not moving.

The metric to match the observed state to a respective model has been enhanced. The likelihood of the target being observed in a respective motion state can be accurately determined, by considering an evolution of accuracies across multiple iterations.

Also, the post-processing can be based modal probabilities of the target being in respective motion state. If the target is moving (pr(movement state)>pr(rest state)) the trajectory of the target can be provided as tracking data. If the target is static, an indication of an input element addressed by the target can be provided as output in the tracking data.

In further detail, it has been described that the processing flow can include three major steps:
1) Pre-Processing of Radar Data (or, generally, other depth data): The Radar Sensor Data is processed by the conventional Signal processing techniques (FFT, CFAR, Beamforming, Clustering). The output is the distance, angle (azimuth and elevation) and velocity of the detected target with respect to the radar sensor. This denotes the depth data.
2) Tracker: This module takes as an input the depth data, e.g., distance, angle and velocity information of the target. The tracker characterizes the dynamics of the target as two separate models. The motion model is used to describe the motion of the target. The static model is used to describe the behavior of the target when stationary. An underlaying Markov process is used to handle the interaction between the two models. An unscented Kalman filter is used to characterize the non-linearities of the system.

3) Application Output/post-processing: The Tracker output—the tracking data—can include of three major parts a) Trajectory of the target b) Current Location of the w.r.t the Touch screen or more generally input elements of a UI. c) Probability suggesting the dynamics of the target (motion or static). The information about the probability of the dynamics of the target can be used to extract the relevant output of the application. If the tracker suggests that it is highly probable that the target is static, a Grid cell location of the touch screen could be provided as an output. If the tracker suggests that the target is highly probable to be moving the trajectory of the target is used to understand a particular gesture or random motion.

Further summarizing, at least the following EXAMPLEs have been described above.

EXAMPLE 1. A method, comprising:
obtaining depth data indicative of a time-resolved measurement of a 3-D position of a moveable target (80) in a field-of-view (75) of a depth sensor (70), and
processing the depth data (752) using an interacting multi-model, IMM, tracking algorithm (760), the IMM tracking algorithm (760) providing, for each one of multiple iterations (7650), tracking data (753) comprising a respective estimate of the 3-D position of the moveable target (80),
wherein the IMM tracking algorithm (760) comprises a first model (7611) providing a first output (7621, 7625), a second model (7612) providing a second output (7622, 7626), and a fusion module (7627, 7635) fusing the first output (7621, 7625) and the second output (7622, 7626) to thereby provide the tracking data (753),
wherein the first model (7611) models a movement state (42) of the moveable target (80),
wherein the second model (7612) models a rest state (41) of the moveable target (80).

EXAMPLE 2. The method of EXAMPLE 1,
wherein the second model (7612) determines the second output (7622) under an assumption of zero velocity (92) of the moveable target (80) and using an estimation covariance determined based on a predefined probability distribution around the 3-D position.

EXAMPLE 3. The method of EXAMPLE 1 or 2,
wherein the first output (7621, 7625) comprises a first state vector (7621) comprising the 3-D position (91) and at least one velocity measure (92) of the moveable target (80),
wherein the second output (7622, 7626) comprises a second state vector (7622) comprising the 3-D position (91) of the moveable target (80),
wherein the second state vector is padded using zero values for the at least one velocity measure (92) prior to said fusing.

EXAMPLE 4. The method of any one of the preceding EXAMPLEs,
wherein the fusion module (7627, 7635) determines a first likelihood (7631) of the moveable target (80) being in the movement state and a second likelihood (7632) of the moveable target (80) being in the rest state,
wherein the fusion module (7627, 7635) determines the tracking data (753) based on a weighted combination using weighting factors set in accordance with the first likelihood and the second likelihood,
wherein the fusion module determines at least one of the first likelihood or the second likelihood based on an evolution of an accuracy (7625, 7626) of the respective one of the first model or the second model over two or more previous iterations of the multiple iterations (7650).

EXAMPLE 5. The method of any one of the preceding EXAMPLEs,
wherein the second model (7612) determines the second output (7622, 7626) based on the estimate of the 3-D position (91) of the moveable target (80) with respect to one or more input elements (111-113) of a user interface (110) predefined within the field-of-view (75),
wherein the moveable target (80) is selected from the group consisting of: hand; part of a hand; and handheld pointing device.

EXAMPLE 6. The method of EXAMPLE 5,
wherein the second output (7622, 7626) comprises an indication of a given one of the one or more input elements (111-113) being addressed by the target (80),
wherein the tracking data (753) comprises, at least for some of the multiple iterations (7650), the indication of the given one of the one or more input elements (111-113).

EXAMPLE 7. The method of EXAMPLE 6,
wherein the tracking data (753) selectively comprises the indication of the given one of the one or more input elements depending on a likelihood of the moveable target (80) being in the rest state.

EXAMPLE 8. The method of EXAMPLE 6 or 7, further comprising:
determining whether one of the one or more input elements is actuated by the user based on the indication of the given one of the one or more input elements (111-113) being addressed by the target.

EXAMPLE 9. The method of any one of EXAMPLEs 5 to 8,
depending on a likelihood that the moveable target (80) is in the movement state, selectively applying (704) a gesture classification based on a dynamic trajectory (95) defined by the estimates of the 3-D position of the moveable target provided in the multiple iterations by the IMM tracking algorithm.

EXAMPLE 10. The method of any one of the preceding EXAMPLEs,
wherein the depth sensor (70) is selected from the group comprising: radar sensor; time-of-flight sensor; stereo camera; LIDAR sensor.

EXAMPLE 11. The method of any one of the preceding EXAMPLEs,
wherein the IMM tracking algorithm (760) updates, for each iteration of the multiple iterations (7650), an a-priori estimate of the 3-D position of the moveable target based on a Markovian decision process (7606), the first output (7621, 7626), the second output (7622, 7626), a first likelihood (7631) of the moveable target (80) being in the movement state (42) in the preceding iteration, and a second likelihood (7632) of the target (80) being in the rest state (41) in the preceding iteration.

EXAMPLE 12. The method of any one of the preceding EXAMPLEs,
wherein the first model (7611) determines the first output based on a prediction of a position and a velocity of the moveable target (80) using an unscented Kalman filter and a coordinated turn model.

EXAMPLE 13. The method of any one of the preceding EXAMPLEs,
wherein the tracking data (753) is indicative of a likelihood that the moveable target (80) is in the movement state (42) or in the rest state (41).

EXAMPLE 14. The method of EXAMPLE 13, further comprising:
selecting a post-processing algorithm for post-processing the tracking data (753) depending on the likelihood that the moveable target (80) is in the movement state (42) or the rest state (41).

EXAMPLE 15. A device comprising a processor, the processor being configured to:
obtain depth data indicative of a time-resolved measurement of a 3-D position of a moveable target (80) in a field-of-view (75) of a depth sensor (70), and
process the depth data (752) using an interacting multi-model, IMM, tracking algorithm (760), the IMM tracking algorithm (760) providing, for each one of multiple iterations (7650), tracking data (753) comprising a respective estimate of the 3-D position of the moveable target (80),
wherein the IMM tracking algorithm (760) comprises a first model (7611) providing a first output (7621, 7625), a second model (7612) providing a second output (7622, 7626), and a fusion module (7627, 7635) fusing the first output (7621, 7625) and the second output (7622, 7626) to thereby provide the tracking data (753),
wherein the first model (7611) models a movement state (42) of the moveable target (80),
wherein the second model (7612) models a rest state (41) of the moveable target (80).

EXAMPLE 16. The device of EXAMPLE 15,
wherein the processor is configured to perform the method of any one of EXAMPLEs 1 to 14.

EXAMPLE 17. A computer-readable storage medium comprising program code executable by a processor, the processor, upon executing the program code, performing a method comprising:
obtaining depth data indicative of a time-resolved measurement of a 3-D position of a moveable target (80) in a field-of-view (75) of a depth sensor (70), and
processing the depth data (752) using an interacting multi-model, IMM, tracking algorithm (760), the IMM tracking algorithm (760) providing, for each one of multiple iterations (7650), tracking data (753) comprising a respective estimate of the 3-D position of the moveable target (80),
wherein the IMM tracking algorithm (760) comprises a first model (7611) providing a first output (7621, 7625), a second model (7612) providing a second output (7622, 7626), and a fusion module (7627, 7635) fusing the first output (7621, 7625) and the second output (7622, 7626) to thereby provide the tracking data (753),
wherein the first model (7611) models a movement state (42) of the moveable target (80),
wherein the second model (7612) models a rest state (41) of the moveable target (80).

EXAMPLE 18. The computer-readable storage medium of EXAMPLE 17,
wherein the processor is configured to perform the method of any one of EXAMPLEs 1 to 14.

EXAMPLE 19. A device, comprising:
means for obtaining depth data indicative of a time-resolved measurement of a 3-D position of a moveable target (80) in a field-of-view (75) of a depth sensor (70), and
means for processing the depth data (752) using an interacting multi-model, IMM, tracking algorithm (760), the IMM tracking algorithm (760) providing, for each one of multiple iterations (7650), tracking data (753) comprising a respective estimate of the 3-D position of the moveable target (80),
wherein the IMM tracking algorithm (760) comprises a first model (7611) providing a first output (7621, 7625), a second model (7612) providing a second output (7622, 7626), and a fusion module (7627, 7635) fusing the first output (7621, 7625) and the second output (7622, 7626) to thereby provide the tracking data (753),
wherein the first model (7611) models a movement state (42) of the moveable target (80),
wherein the second model (7612) models a rest state (41) of the moveable target (80).

EXAMPLE 20. A device, comprising:
a module for obtaining depth data indicative of a time-resolved measurement of a 3-D position of a moveable target (80) in a field-of-view (75) of a depth sensor (70), and
a module for processing the depth data (752) using an interacting multi-model, IMM, tracking algorithm (760), the IMM tracking algorithm (760) providing, for each one of multiple iterations (7650), tracking data (753) comprising a respective estimate of the 3-D position of the moveable target (80),
wherein the IMM tracking algorithm (760) comprises a first model (7611) providing a first output (7621, 7625), a second model (7612) providing a second output (7622, 7626), and a fusion module (7627, 7635) fusing the first output (7621, 7625) and the second output (7622, 7626) to thereby provide the tracking data (753),
wherein the first model (7611) models a movement state (42) of the moveable target (80),
wherein the second model (7612) models a rest state (41) of the moveable target (80).

EXAMPLE 21. A method, comprising:
determining an estimate of a 3-D position of a moveable target using an interacting multi-model, IMM, tracking algorithm based on measurements of depth data, at least one model of the IMM tracking algorithm modeling a rest state of the moveable target. Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

What is claimed is:
1. A method, comprising:
obtaining depth data indicative of a time-resolved measurement of a 3-D position of a moveable target in a field-of-view of a depth sensor; and
processing the depth data using an interacting multi-model (IMM) tracking algorithm, the IMM tracking algorithm providing, for each one of multiple iterations, tracking data comprising a respective estimate of the 3-D position of the moveable target, wherein:
the IMM tracking algorithm comprises a first model providing a first output, a second model providing a second output, and a fusion module fusing the first output and the second output to provide the tracking data, the first model models a movement state of the moveable target, the second model models a rest state of the moveable target, the second model determines the second output based on the estimate of the 3-D position of the moveable target with respect to an input element of a user interface predefined within the field-of-view, the user interface comprises a plurality of input elements, the second output comprises an indication of a given input element of the plurality of input elements being addressed by the moveable target, and the tracking data comprises, at least for some of the multiple iterations, the indication of the given input element.

2. The method of claim 1, wherein the second model determines the second output under an assumption of zero velocity of the moveable target and using an estimation covariance determined based on a predefined probability distribution around the 3-D position.

3. The method of claim 1, wherein:
the first output comprises a first state vector comprising the 3-D position and a velocity measure of the moveable target;
the second output comprises a second state vector comprising the 3-D position of the moveable target; and
the second state vector is padded using zero values for the velocity measure prior to the fusing.

4. The method of claim 1, wherein:
the fusion module determines a first likelihood of the moveable target being in the movement state and a second likelihood of the moveable target being in the rest state;
the fusion module determines the tracking data based on a weighted combination using weighting factors set in accordance with the first likelihood and the second likelihood; and
the fusion module determines at least one of the first likelihood or the second likelihood based on an evolution of an accuracy of the respective one of the first model or the second model over two or more previous iterations of the multiple iterations.

5. The method of claim 1, wherein the moveable target is selected from a group comprising of: hand, part of a hand, and handheld pointing device.

6. The method of claim 1, wherein the tracking data selectively comprises the indication of the given input element depending on a likelihood of the moveable target being in the rest state.

7. The method of claim 1, further comprising determining whether one of the plurality of input elements is actuated by a user based on the indication of the given input element being addressed by the moveable target.

8. The method of claim 1, further comprising, depending on a likelihood that the moveable target is in the movement state, selectively applying a gesture classification based on a dynamic trajectory defined by the estimates of the 3-D position of the moveable target provided in the multiple iterations by the IMM tracking algorithm.

9. The method of claim 1, wherein the depth sensor is selected from a group comprising: radar sensor, time-of-flight sensor, stereo camera, and LIDAR sensor.

10. The method of claim 1, wherein the IMM tracking algorithm updates, for each iteration of the multiple iterations, an a-priori estimate of the 3-D position of the moveable target based on a Markovian decision process, the first output, the second output, a first likelihood of the moveable target being in the movement state in a preceding iteration, and a second likelihood of the moveable target being in the rest state in the preceding iteration.

11. The method of claim 1, wherein the first model determines the first output based on a prediction of a position and a velocity of the moveable target using an unscented Kalman filter and a coordinated turn model.

12. The method of claim 1, wherein the tracking data is indicative of a likelihood that the moveable target is in the movement state or in the rest state.

13. The method of claim 12, further comprising selecting a post-processing algorithm for post-processing the tracking data depending on the likelihood that the moveable target is in the movement state or the rest state.

14. A device comprising a processor and a memory with instructions stored thereon, wherein the instructions, when executed by the processor, enable the device to perform the method of claim 1.

15. The device of claim 14, wherein the device comprises a time-of-flight sensor, a radar sensor, a stereo camera, or a LIDAR sensor.

16. A device comprising:
a radar sensor comprising a transmitter configured to transmit radar signals towards a field-of-view of the radar sensor, a receiver configured to receive reflected radar signals from the field-of-view, wherein the radar sensor is configured to provide raw measurement data based on the reflected radar signals; and
a processor configured to:
generate depth data indicative of a time-resolved measurement of a 3-D position of a moveable target in the field-of-view based on the raw measurement data; and
process the depth data using an interacting multi-model (IMM) tracking algorithm, the IMM tracking algorithm providing, for each one of multiple iterations, tracking data comprising a respective estimate of the 3-D position of the moveable target, wherein:
the IMM tracking algorithm comprises a first model configured to provide a first output, a second model configured to provide a second output, and a fusion module configured to fuse the first output and the second output to provide the tracking data,
the first model is configured to model a movement state of the moveable target,
the second model is configured to model a rest state of the moveable target,
the second model determines the second output based on the estimate of the 3-D position of the moveable target with respect to an input element of a user interface predefined within the field-of-view,
the user interface comprises a plurality of input elements,
the second output comprises an indication of a given input element of the plurality of input elements being addressed by the moveable target, and
the tracking data comprises, at least for some of the multiple iterations, the indication of the given input element.

17. The device of claim 16, wherein the processor is configured to selectively apply a gesture classification based on a dynamic trajectory defined by the estimates of the 3-D position of the moveable target provided in the multiple iterations by the IMM tracking algorithm depending on a likelihood that the moveable target is in the movement state.

18. A method, comprising:
obtaining depth data indicative of a time-resolved measurement of a 3-D position of a moveable target in a field-of-view of a depth sensor; and
processing the depth data using an interacting multi-model (IMM) tracking algorithm, the IMM tracking algorithm providing, for each one of multiple iterations, tracking data comprising a respective estimate of the 3-D position of the moveable target, wherein the IMM tracking algorithm comprises a first model providing a first output, a second model providing a second output, and a fusion module fusing the first output and the second output to provide the tracking data, wherein the first model models a movement state of the moveable target, wherein the second model models a rest state of the moveable target, and wherein processing the depth data further comprises determining the second output based on the estimate of the 3-D position of the moveable target with respect to an input element of a user interface predefined within the field-of-view using the second model.

19. The method of claim 18, wherein the second model determines the second output under an assumption of zero velocity of the moveable target and using an estimation covariance determined based on a predefined probability distribution around the 3-D position.

20. The method of claim 18, wherein the moveable target is selected from a group comprising of: hand, part of a hand, and handheld pointing device.

* * * * *